United States Patent [19]
Ferguson

[11] 3,856,535
[45] Dec. 24, 1974

[54] EMULSIFIABLE HALOALKYL PHOSPHATE BLEND FOR AQUEOUS TEXTILE FLAME-RETARDANT TREATMENTS

[75] Inventor: Christopher A. Ferguson, Wilmington, Del.

[73] Assignee: ICI America Inc., Wilmington, Del.

[22] Filed: Dec. 6, 1973

[21] Appl. No.: 422,521

[52] U.S. Cl. ............... 106/15 FP, 117/136, 252/8.1
[51] Int. Cl. .............................................. C09d 5/18
[58] Field of Search .......... 106/15 FP, 271; 252/8.1; 117/136

[56] References Cited
UNITED STATES PATENTS

| | | | |
|---|---|---|---|
| 2,330,251 | 9/1943 | Taylor | 117/136 |
| 2,574,515 | 11/1951 | Walter | 106/177 |
| 2,828,213 | 3/1958 | Neff | 106/15 FP |
| 2,892,732 | 6/1959 | Rockland | 106/271 |
| 2,926,097 | 2/1960 | Leatherman | 106/15 FP |
| 3,279,929 | 10/1966 | Peters | 106/18 |
| 3,354,180 | 11/1967 | Ekiss | 106/271 |
| 3,519,562 | 7/1970 | Lanner | 106/271 |
| 3,668,302 | 6/1972 | Boland | 117/136 |
| 3,729,434 | 4/1973 | Todd | 106/15 FP |

Primary Examiner—Morris Liebman
Assistant Examiner—Paul R. Michl
Attorney, Agent, or Firm—Roger R. Horton

[57] ABSTRACT

A textile flame retarding treating agent blend useful in making stable aqueous emulsions is presented which consists of a flame retarding agent having the general formula $(XH_2C-CHXCH_2O)_3-PO$ and $[XH_2C-CH(CH_2X)O]_3-PO$ where X is Cl or Br and 5 – 20 percent by weight of the agent of an alkoxylated fatty acid ester emulsifier having an HLB of 14.5 – 18.7.

9 Claims, No Drawings

EMULSIFIABLE HALOALKYL PHOSPHATE BLEND FOR AQUEOUS TEXTILE FLAME-RETARDANT TREATMENTS

This invention relates to a flame retarding treating agent blend useful in making stable aqueous emulsions for use in treating textiles. Specifically, it is directed to a blend of flame retardants represented by the formulas $(XH_2C-CHXCH_2O)_3-PO$ and $[XH_2C-CH(CH_2X)O]_3-PO$ wherein X can be bromine or chlorine which is combined with an emulsifying agent having an HLB of 14.5 – 18.7 comprising ethoxylated or propoxylated fatty acid esters of glycerol having a high average molecular weight of 6,500 – 14,000 or a blend of such high molecular weight materials with up to 150 percent by weight of a low molecular weight fatty acid ester of glycerol, sorbitol, sorbitan and ethoxylated or propoxylated fatty acid esters of glycerol, sorbitol, or sorbitan having a molecular weight in the range of 1,000 – 6,500. Such blends are useful in preparing stable aqueous solutions through which are passed flammable textiles such as cotton, viscose rayon, ramie, jute, burlap, which are hydrophilic materials in addition to man made fibers which are spun from organic polymers such as nylons, polyester resins, and the like, which take up water by capillary attraction. When textiles are treated with aqueous solutions containing sufficiently high concentrations of the phosphate derivative and thereafter dried there remains a sufficiently high impregnation of the flame retardant to render the textile sufficiently nonflammable.

Flame retarding phosphate derivatives as described above such as tris(2,3-dibromopropyl)phosphate and tris(1-bromo-3-chloroisopropyl)phosphate are well known as flame retarding agents and have been used to treat cellulose materials as well as polymer resins such as polystyrene, polyesters, polyurethane foams, epoxy resins, and the like, as described in U.S. Pat. Nos. 2,574,515; 3,121,106; 3,279,929; and 3,729,434. While such phosphate derivatives are particularly excellent as flame retarding agents they are especially difficult to disperse in aqueous solutions. As pointed out in U.S. Pat. No. 3,729,439, the phosphate esters have resisted efforts to form aqueous emulsions which are stable enough to be useful even when a wide variety of emulsifying agents have been employed. Stable emulsions were formulated only after the flame retardant ester was first dissolved in an organic solvent and thereafter finding a suitable agent for the solvent to form an oil-in-water emulsion. It has become common in the art of solubilizing the phosphate flame retardants to use 5 to 50 percent of an organic solvent such as high flash naphta, xylene, alkylbenzene, and other similar relatively high boiling derivatives. While the incorporation of the solvent was necessary to accomplish a stable emulsion, certain disadvantages resulted such as the flammability and toxicological hazards surrounding the textile application bath; softening of certain types of squeeze rolls and equipment used for their application, the attack of certain dyes by some of the solvents employed, and the low take-up of the fire retardant by the treated materials.

The present invention has now provided a select combination of dispersing agents which are compatible with the phosphate flame retarding agents and offer an emulsifying system which enables the phosphate derivative to be combined in an aqueous solution in the absence of an organic solvent such as listed above, to form stable emulsions having 5 – 99 percent water.

It is, therefore, an object of the invention to provide an easily emulsifiable blend of tris-(dihaloalkyl)phosphate flame retardants with aqueous systems having stability over extended periods of time.

It is another object of the invention to provide aqueous emulsions containing such flame retardants as tris(-2,3-dibromopropyl)phosphate; tris(1-bromo-3-chloroisopropyl) phosphate; tris(1-3- and tris(1,3-dichloropropyl)phosphate which are uniformly stable over the period of their use.

Another object of the invention is to provide a blend of tris(dihaloalkyl)phosphates with selective emulsifiers having an HLB in the range of 14.5 – 18.7.

These and other objects of the invention are met by combining a flame retarding agent having the general formula $(XH_2C-CHXCH_2O)_3-PO$ and $[XH_2C-CH(CH_2X)O]_3-PO$ wherein X is chlorine or bromine with 5 – 20 percent by weight of the flame retarding agent of an emulsifier which comprises ethoxylated or propoxylated fatty acid esters of glycerol having a high average molecular weight of 6,500 – 14,000 and up to 150 percent by weight based on the weight of the high molecular weight material of a lower molecular weight fatty acid ester of glycerol, sorbitol, sorbitan and ethoxylated or propoxylated fatty acid ester of glycerol, sorbitol, or sorbitan having a molecular weight in the range of 1000 – 6,500 and in which the fatty acid portion of said ester has 10 – 22 carbon atoms and the mol ratio of the fatty acid moiety to the number of available hydroxyl groups on the polyol range between 1/6 – 1.

Flame retardants of the invention are readily available commercially or can be obtained by refluxing phosphoric acid esters, phosphoric acid, phosphorous oxychlorides or phosphorus pentoxide in appropriate solvents with reactants such as 2,3-dibromopropanol, 2,3-dichloropropanol, 2-bromo-3-chloropropanol, 2-chloro-3-bromopropanol, 1,3-dibromoisopropanol, 1-bromo-3-chloroisopropanol, and similar alcohols having additional chlorine and bromine adjacent the hydroxyl group. These reactions are usually conducted in the temperature range of 100° to 105°C. under a nitrogen blanket and their reaction products recovered by vacuum distillation to remove excess solvent.

The above flame retardants are combined with an emulsifier having a hydrophile-lipophile balance (HLB) of 14.5 – 18.7 in varying quantities such that the amount of the emulsifier ranges between 5 – 20 percent by weight of the flame retarding agent. It has been discovered that the emulsifier can be 100 percent of an ethoxylated or propoxylated fatty acid ester of glycerol having an average molecular weight of 6,500 – 14,000 or a mixture of these glyceride esters with up to 150 percent of a lower molecular weight fatty acid ester of glycerol, sorbitol, sorbitan or ethoxylated or propoxylated fatty acid esters of glycerol, sorbitol, or sorbitan such that their molecular weight ranges between 1,000 and 6,500.

The high molecular weight emulsifiers are selected from fatty acid esters of glycerol having from 100 – 300 mols of alkylene oxide per mol of fatty acid ester.

Fatty acids derived from natural fats and oils are particularly useful and comprise both saturated and unsaturated monocarboxylic acids and hydroxy monocarboxylic acids having 10 – 22 carbon atoms. Of particular interest are those materials having a predominance of 16 and 18 carbon atoms and comprise palmitic, palmitoleic, stearic, oleic, linoleic, linolenic, ricinoleic, hydroxy stearic, licanic, elaeostearic, and eicosenoic.

Materials derived from natural occuring fats such as butter fat, castor oil, cocoa butter, coconut oil, corn oil, seed oil, lard, sunflower, soybean, tall oil, and tung oils which have been alkoxylated either before or after partial hydrolysis to the mono or diesters of glycerin are useful. Of particular interest is the alkoxylated derivative of castor oil which comprises about 88 percent of the glycerides of ricinoleic acid and a minor percentage of a few other 16 and 18 carbon atom monocarboxylic acids.

The high molecular weight emulsifying agents are formed by reacting mono-, di-, and triglycerides of the above listed acids with from 100 to 300 mols per mol of ester of ethylene or propylene oxide to form compositions having molecular weights in the range of 6,500 – 14,000. Such materials having a hydrophilic-lipophilic balance (HLB) of 14.5 – 18.7 are useful in emulsifying the flame retardants.

It should be emphasized that the HLB value is significant only in relation to the total blend of the emulsifier. It should be further pointed out that not all emulsifiers having an HLB within the stated range are useful unless they meet the requirements of the invention. The HLB is a determination of the hydrophile-lipophile balance values of nonionic emulsifiers which is a way of designating the balance between polar and nonpolar moieties in an emulsifier molecule or group of compounds. Methods for determining the HLB of a substance are set forth in "The Atlas HLB System" Fourth Printing, Atlas Chemical Industries, Inc., Wilmington, Del., 1963, and in Petrowski, G. E. and Vanatta, J. R., *J. American Chem. Soc.*, pages 284–289, Aug., 1973.

While high molecular weight compositions described above having an HLB as high as 18.7 are useful, it is desirable and preferred to blend them with materials having a lower molecular weight to form a blend having a preferred HLB in the range of 14.5 – 16.0. Preferred emulsifiers having an HLB of 15 – 15.8 can be made by adding up to 120 percent by weight of a low molecular weight material to the high molecular weight fatty acid ester.

A preferred blend is one containing 40 – 70 percent by weight polyethoxy(200)castor oil as the high molecular weight component and 30 – 60 percent by weight polyethoxy(20)–sorbitan trioleate as the low molecular weight emulsifier.

Low molecular weight materials can be fatty acid esters of glycerol, sorbitol, sorbitan, or alkoxylated derivatives of fatty acid esters of glycerol, sorbitol, or sorbitan, which have a molecular weight in the range of 1,000 – 6,500 and wherein the fatty acid moiety in said esters is similar to that described above for the high molecular weight materials. Said low molecular weight fatty acid esters of glycerol, sorbitol, and sorbitan have 1/6 – 1 mol of fatty acid moiety per mol of polyol. These materials can have 5 to 50 mols of alkylene oxide per mol of ester and are formed by either reacting the alkylene oxide with the ester having free hydroxyl groups or with the polyol prior to esterification. In the latter case, the fatty acid ester moiety is linked to the end of the polyether side chain.

Emulsifiers of the invention are made by standard techniques wherein alkylene oxides such as propylene or ethylene oxide is added as a gas to a heated, stirred autoclave containing the polyol or a mixture of polyols to be alkoxylated to a given molecular weight. Such materials manufactured by reacting sorbitan trioleate with 20 mols of ethylene oxide per mol are designated as polyoxyethylene (20) sorbitan trioleate, or POE(20) sorbitan trioleate, and compositions made by reacting 3 mols of oleic acid with 1 mol of polyoxyethylene(15)-glycerol would be designated as POE(15)glycerol trioleate. A substance made by reacting castor oil triglycerides of ricinoleic, palmitic, and stearic acids) with 200 mols per mol of ethylene oxide or propylene oxide would be designated polyoxyethylene(200)castor oil, or polyoxypropylene(200)castor oil. Compositions resulting from the combined propoxylation or ethoxylation of triols either as mixtures or ethylene oxide with propylene oxide or by sequential alkoxylation of castor oil yield products such as POE(100)POP(100) castor oil which indicates that 100 mols of propylene oxide and ethylene oxide were reacted with 1 mol of cator oil in the hydroxyl groups of the ricinoleic acid moiety.

The blends of the invention are made by first heating the emulsifiers in the range of 35° – 40°C. to form complete liquids. A little water can be added to the emulsifier in the range of 5 – 20 percent to decrease the viscosity of the emulsifier blend and increase the compatibility of the phosphate fire retardant material with the emulsifier. The phosphates are gradually blended into the emulsifier with vigorous agitation at temperatures of 65° – 80°C. However, higher or lower temperatures can be used to obtain a suitable result. After cooling, the concentrated blend usually results as a very viscous, slightly pourable or nonpourable paste.

These paste emulsions are easily storable and can be employed in the textile mill by stirring the paste into water at room temperature or slightly warmer to form pad baths containing 10 – 50 percent flame retardant phosphates in the form of emulsions having stability through 24 hours with only slight (1 – 2 percent) separation of the phosphate.

The following examples are typical of results obtained from the emulsifier blends of the invention. In addition to the ingredients of the emulsifier and the fire retardant they may contain other ingredients usually incorporated in the treating bath such as wetting agents, dye carrier solvents, softeners, and the like, in minor amounts up to 10 – 20 percent.

EXAMPLE 1

80 parts by weight tris(2,3-dibromopropyl)phosphate [Great Lakes TP-69] is added to a blend containing 10 parts water, 6 parts POE(200)hydrogenated castor oil and 4 parts of POE(20-)sorbitan trioleate [Tween-85] heated to 65° – 80°C. with vigorous stirring. The resulting product was poured from the vessel and permitted to cool to form a slowly pourable oil-in-water emulsion paste stable over extended periods of time.

For use in textile treatment the pourable paste is diluted to form an aqueous emulsions containing 20 percent by weight of the dihaloalkyl phosphate derivative by mixing the blend containing 80 parts by weight flame retardant with 310 parts water. The solution was found to be unseparated after 8 hours and only 1 – 2 percent separated after 24 hours.

A 3 inch by 12 inch swatch of 100 percent polyester taffeta was dipped into the 20 percent treating bath two times followed by padding through squeeze rolls adjusted to yield 40 percent wet pickup. The sample was dried at 225°F. for 1 minute followed by curing at 400°F. for 1 minute in a hot air oven. The sample did not burn when subjected to match flame tests.

In Table I are tabulated stability data typical of emulsifier blends of the invention. The data of Examples 1-13 are tabulated to show the composition of the blend using high and low molecular weight emulsifiers in concentrations designated as parts by weight of the blend in addition to the combined HLB of the blend prior to mixing with the flame retardant added thereto. A stability of an emulsion containing 20 percent of the flame retardant, as indicated in Example 1, is shown in the column to the right. The concentration ranges used are held relatively constant for purposes of more meaningful comparison but the invention is not intended to be limited thereto.

TABLE I

EXAMPLES 1-13

| Example No. | HIGH MOL. WT. EMULSIFIER Compound | Ave. Mol.Wt. (approx.) | Parts by wt. | LOW MOL. WT. EMULSIFIER Compound | Ave. Mol.Wt. (approx.) | Parts by wt. | Blend HLB (approx.) | FLAME RETARDANT ( )$_3$PO | Parts by wt. | STABILITY (20% F.R. in water) % F.R. Separated after 8 hrs. |
|---|---|---|---|---|---|---|---|---|---|---|
| 1 | POE(200) Castor Oil | 9,700 | 6.0 | POE(20) Sorbitan Trioleate | 1,900 | 4.0 | 15.3 | $CH_2BrCHBr-CH_2O$ | 80 | none |
| 2 | POE(200) Castor Oil | 9,700 | 6.0 | POE(20) Sorbitan Tristearate | 1,900 | 4.0 | 14.7 | $CH_2BrCHBr-CH_2O$ | 80 | <3% |
| 3 | POE(125) Castor Oil | 6,500 | 7.5 | POE(20) Sorbitan Trioleate | 1,900 | 2.5 | 15.5 | $CH_2BrCHBr-CH_2O$ | 80 | <3% |
| 4 | POE(300) Castor Oil | 14,000 | 6.0 | POE(20) Sorbitan Trioleate | 1,900 | 4.0 | 15.6 | $CH_2BrCHBr-CH_2O$ | 80 | none |
| 5 | POE(200) Castor Oil | 9,700 | 7.0 | POE(15) Glycerol Trioleate | 1,550 | 3.0 | 15.3 | $CH_2BrCHBr-CH_2O$ | 80 | none |
| 6 | POE(300) Castor Oil | 14,000 | 6.5 | POE(20) Sorbitan Trioleate | 1,900 | 3.5 | 16.0 | $CH_2BrCHBr-CH_2O$ | 80 | <3% |
| 7 | POE(300) Castor Oil | 14,000 | 4.6 | POE(20) Sorbitan Trioleate | 1,900 | 5.4 | 14.5 | $CH_2BrCHBr-CH_2O$ | 80 | <3% |
| 8 | POE(200) Castor Oil | 9,700 | 10 | ------ | ----- | --- | 18.1 | $CH_2BrCHBr-CH_2O$ | 80 | <3% |
| 9 | POE(125) Castor Oil | 6,500 | 10 | ------ | ----- | --- | 17.1 | $CH_2BrCHBr-CH_2O$ | 80 | <10% |
| 10 | POE(300) Castor Oil | 14,000 | 10 | ------ | ----- | --- | 18.6 | $CH_2BrCHBr-CH_2O$ | 80 | <3% |
| 11 | POE(200) Castor Oil | 9,700 | 6.0 | POE(20) Sorbitan Trioleate | 1,900 | 4. | 15.3 | $CH_2ClCHCl-CH_2O$ | 80 | none |
| 12 | POP(150) Castor Oil | 9,600 | 6.0 | POP(15) Sorbitan Tristearate | 1,890 | 4. | 15.0 | $CH_2ClCHBr-CH_2O$ | 80 | <3% |
| 13 | POP(100) POE(100) glycerol trioleate | 12,000 | 7.5 | POP(10)POE(10) Sorbitan Tristearate | 2,050 | 3.5 | 14.8 | $CH_2BrCHCH_2O$<br>$\|$<br>$CH_2Br$ | 80 | <3% |

What is claimed is:

1. A textile flame retarding treating agent blend useful in making stable aqueous emulsions consisting essentially of:
   a. a flame retarding agent having the general formula (XH$_2$C—CHXCH$_2$O)$_3$—PO and [XH$_2$C—CH(CH$_2$X)O]$_3$—PO wherein X is chlorine or bromine, and
   b. 5 – 20 percent by weight of said flame retarding agent of an emulsifier having an HLB of 14.5 – 18.7 which comprises ethoxylated or propoxylated fatty acid esters of glycerol having a high average molecular weight of 6,500 – 14,000 and up to 150 percent by weight of said high molecular weight fatty acid ester of a low molecular weight fatty acid ester of glycerol, sorbitol, or sorbitan and ethoxylated or propoxylated fatty acid esters of glycerol, sorbitol, or sorbitan having a molecular weight in the range of 1,000 – 6,500 and wherein said fatty acid moiety in said esters have 10 – 22 carbon atoms.

2. A blend of claim 1 wherein said high molecular weight fatty acid ester is made by reacting 100 – 300 mols of propylene or ethylene oxide per mol of glycerol ester.

3. A blend of claim 2 wherein said glyceryl ester is castor oil.

4. A blend of claim 1 wherein said low molecular weight fatty acid ester of ethoxylated or propoxylated glycerol or sorbitol is made by reacting 5 – 50 mols of alkylene oxide per mol of polyol.

5. A blend of claim 4 wherein said low molecular weight fatty acid ester is glyceryl or sorbitan trioleate.

6. A composition of claim 3 wherein said high molecular weight ester is polyethoxy(200)castor oil.

7. A blend of claim 5 having 40 – 70 percent polyethoxy(200)castor oil as a high molecular weight fatty acid ester and 30 – 60 percent by weight polyethoxy(20)sorbitan trioleate.

8. A composition of claim 6 wherein said flame retarding agent is tris(2,3-dibromopropyl)phosphate, said emulsifier is a blend containing 60 percent by weight polyethoxy(200)castor oil and 40 percent by weight polyethoxy(20)sorbitan trioleate wherein said blend has an average HLB in the range of 15.0 – 15.8.

9. An aqueous composition of a blend of claim 1 containing 5 – 99 percent water.

* * * * *